June 17, 1952 C. G. BOYER 2,600,837
DEVICE FOR REMOVING WRAPPERS FROM PACKAGED GOODS, SUCH
AS CHEWING GUM, CONFECTIONS OR THE LIKE
Filed Aug. 6, 1947 2 SHEETS—SHEET 1
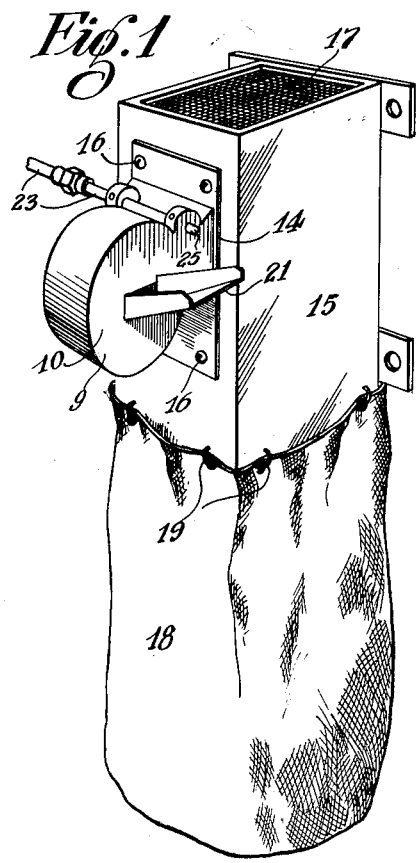
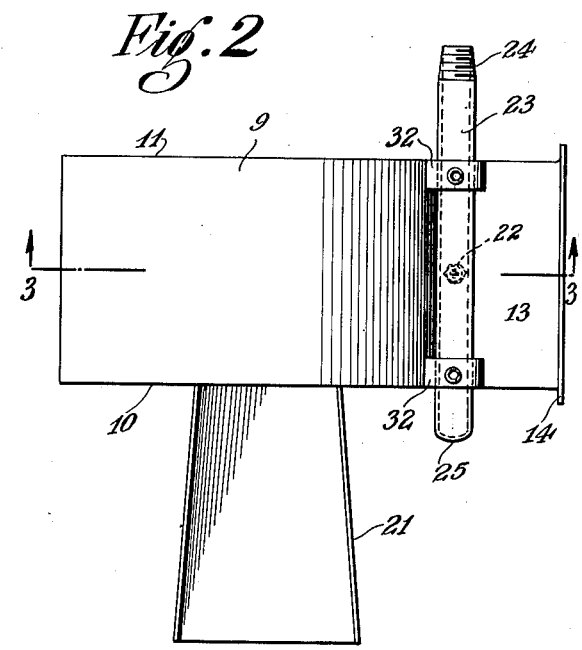
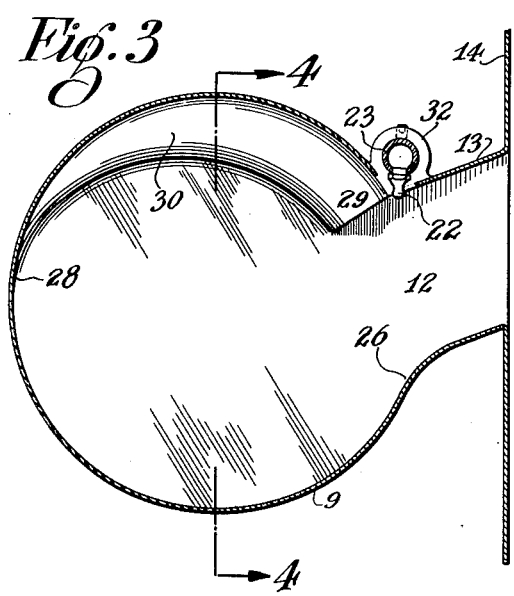
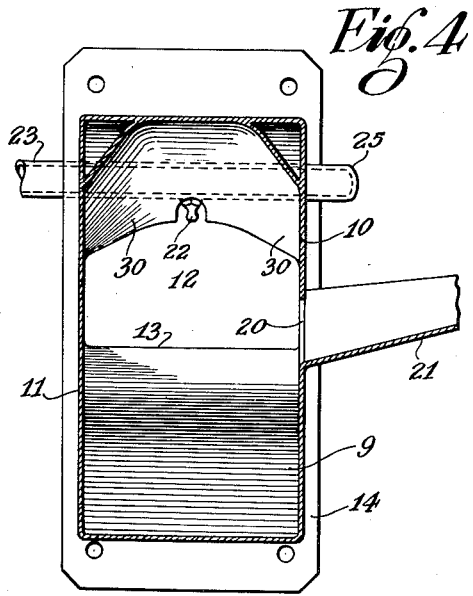
INVENTOR.
Clay G. Boyer
BY
Synnestvedt & Lechner
Attys.

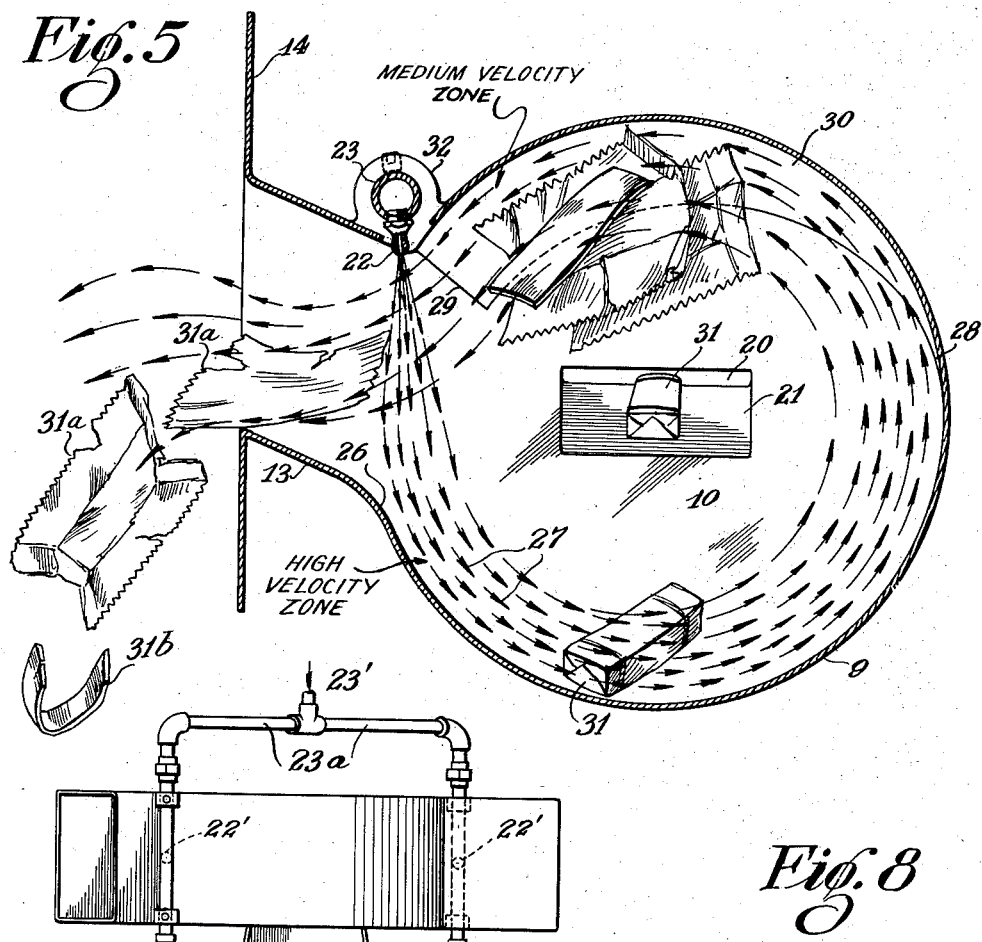
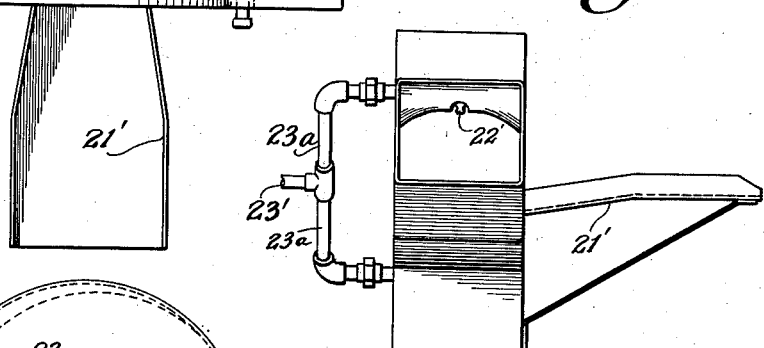
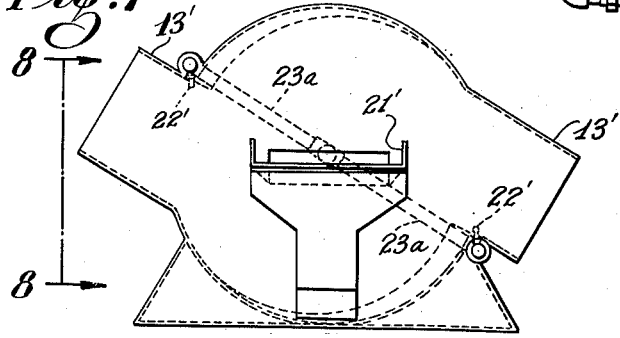

Patented June 17, 1952

2,600,837

UNITED STATES PATENT OFFICE 2,600,837

DEVICE FOR REMOVING WRAPPERS FROM PACKAGED GOODS, SUCH AS CHEWING GUM, CONFECTIONS, OR THE LIKE

Clay G. Boyer, Philadelphia, Pa.

Application August 6, 1947, Serial No. 766,600

7 Claims. (Cl. 209—2)

This invention relates to a device for removing the wrappers (paper, foil, cellophane or the like) from packaged goods and has been developed primarily for use in connection with salvaging the gum from rejected packages of chewing gum although it is obvious that it is not to be limited to this field of usefulness because the principles involved can equally well be applied to the removal of wrappers from other packaged goods where the relationship between the wrapping and the contents is essentially similar to that which exists between the wrappings on a package of chewing gum and the gum itself.

In wrapping packaged goods of one kind or another and particularly in the wrapping of chewing gum or confections, it frequently happens that the wrapping is defective for some reason or other especially when the wrapping is done by machine which is usually the case. Such defectively wrapped packages must be rejected insofar as sales are concerned but it is important from the standpoint of economy not to waste the contents. It is customary, therefore, to remove the wrappers in order to save the contents especially in the case of chewing gum and this has generally been done by hand labor which naturally is tedious, time consuming and expensive.

The present invention has for its primary object the provision of a device for mechanically removing wrappers from packaged goods in which the percentage of recovery is exceedingly high and by means of which the work can be done with great rapidity and at minimum cost.

The nature and purposes of the invention as well as its objects and advantages will be more fully appreciated and understood in connection with the accompanying drawings which illustrate present preferred embodiments and in which Figure 1 is a perspective view of my device as applied to a boxlike member for receiving the separated wrappers and the contents of the packages;

Figure 2 is a plan view on an enlarged scale;

Figure 3 is a section on the line 3—3 of Figure 2;

Figure 4 is a section on the line 4—4 of Figure 3;

Figure 5 is a section similar to that of Figure 3 but looking in the opposite direction and on a scale still somewhat enlarged over that of Figures 2 to 4 and in which an effort has been made to diagrammatically indicate the manner in which the device functions;

Figure 6 is a plan view of a modified form of the invention.

Figure 7 is a side elevation of the device of Figure 6; and

Figure 8 is an edge elevation taken approximately as indicated by the line 8—8 in Figure 7.

Examination of the various figures will show that my device is composed essentially of a housing 9 which in the present instance is an annular drumlike member having parallel sides or drum heads 10 and 11. The periphery of the drum is provided with an opening 12 of sufficient size to pass the goods, such opening having a projecting neck 13, the axis of which extends outwardly in a direction generally radially of the drum although preferably inclined slightly from a true radial direction toward the direction from which a jet of air is supplied in accordance with the description appearing hereinafter. Surrounding the outer end of the neck is an attaching flange 14 by means of which my device can be secured to a suitable box 15 as by screws 16. The box 15 forms no part of the invention per se but is provided merely as a convenient means for catching the material discharged through the opening 12 and the neck 13 in a manner to be described hereinafter. At this point it might be noted, however, that the box 15 is open at the top but is covered by a grating or screen 17 to confine the material within the box. The box is also open at the bottom and discharges into a collecting bag 18 which is hung upon the hooks 19 and when full can be readily replaced by an empty bag. However, the parts 15 to 19 inclusive form no part of the invention per se but are only a convenience in connection with its use.

The housing is further provided with an opening 20 in one of the drum heads. This opening serves as a wrapped package inlet and is arranged to receive the goods and deliver them to the interior in a direction which is generally axial of the drum. For convenience a lead-in trough or spout 21 may be provided which is inclined as shown in order to facilitate the movement of the packages to the interior of the device.

A jet or nozzle 22 projects substantially centrally through the upper portion of the neck 13 approximately at the point where the neck joins the rim of the drum as shown to best advantage in Figures 3 and 5. This nozzle is supplied with a suitable gas under pressure, preferably air, although any compressed inert gas can be employed for the purpose if compressed air is not available. The compressed air or gas is supplied through a pipe 23 into the lower portion of which the nozzle is threaded, one end of the pipe having a thread 24 for connection to a delivery line and the other end being closed as at 25.

As will be seen upon inspection, particularly of Figures 3 and 5, the nozzle is arranged to project a jet of high velocity air or gas in a direction transverse of the opening 12 at the base of the neck 13, i. e., generally circumferentially of the drum, although, as will be noted, the nozzle is turned slightly so as to cause the jet to impinge against the wall of the annular pathway formed by the rim of the drum at a point just beyond the lower portion of the neck 13 which point I have indicated generally by the reference character 26. The path of flow of the jet is indicated by the lines and arrows 27 in Figure 5. At the point 26 where the jet first impinges it will be noted that the wall of the neck is curved or rounded outwardly to form a smooth contour the purpose of which will appear more fully hereinafter.

The interior of the housing or drum provides a generally annular path around which the jet of air circulates in a gradually expanding or flaring curve and at relatively high velocity in the manner roughly indicated by the flow lines and arrows in Figure 5, although it will be understood, of course, that it is practically impossible to illustrate this in the exact way in which it takes place. It will also be realized that the jet flares not only inwardly of its path but also transversely. In the region of the outlet opening 12 between the nozzle 22 and the point 26 the jet, of course, develops a zone of relatively high velocity whereas at the other side after the jet has passed completely around its path of travel there is developed a relatively low or medium velocity zone. These zones are marked with suitable legends in Figure 5. In the central portion of the device there is also a zone of relatively low velocity and it will be noted that the spout 21 and the inlet opening 20 deliver to approximately the central region of this central low velocity area.

Extending from a point immediately in back of the nozzle for a distance which is preferably approximately one-third of the circumference of the annular pathway, I prefer to form the pathway as a tapered passage with its widest point farthest away from the nozzle and approximately coinciding with the width of the annular path. This point is marked by the reference character 28 from which point in a clockwise direction toward the nozzle as viewed in Figure 3 the pathway is constricted or tapered so as to converge to its narrowest extent at a point 29 immediately in back of the nozzle 22. This tapered portion of the annular pathway is provided by introducing properly formed inclined plate members 30 curved to conform to the contour of the drum and secured in place as by welding along the edges. However, the method of forming this tapered portion and the manner of securing it in position is not a critical factor although smoothness of contour should be maintained to as great an extent as possible so as to interfere as little as possible with the smoothness of the pathway.

The purpose of the tapered portion 28, 29 and 30 is to change the position of the package for which reason its size and shape may vary somewhat depending upon the nature of the packaged goods which are being handled. For a package of gum containing five sticks of the customary size, the tapered portion is designed to have an overall width at the exit 29 which is considerably narrower than the length of the package and which, of course, tapers from that point toward the point 28, the width at the point 28, as already indicated, being substantially coincident with the width of the drum and therefore with the annular pathway provided by the drum, this width being at least as great and preferably somewhat greater than the length of a five stick package of chewing gum in instances where the device is designed to handle such packages.

Although I do not fully understand the nature of the action which occurs I will now describe as well as I can the method of operation.

To begin with I wish to call attention to the fact that the embodiment of my invention illustrated in Figures 1 to 5 inclusive involves the use of a drum which is approximately 6½ inches in diameter and 3½ inches in depth or width. These are outside dimensions but because the device is made of relatively thin sheet metal stock, the inside dimensions are not very much smaller. The opening 12 is approximately 2¾ inches in the circumferential direction and just short of 3½ inches in the transverse direction. The nozzle has a jet opening of approximately ⅛ inch diameter and the inlet opening 20 is approximately 1 inch high by 2¼ inches wide. The nozzle is supplied with air or gas under a pressure of approximately 90 to 100 pounds per square inch. In many of my tests I have employed a tank of compressed air at 100 pounds pressure but allowing for the drop in pressure through the delivery line I estimate that the pressure at the nozzle exit is approximately 90 pounds per square inch.

The foregoing figures are given by way of illustration only and not by way of limitation because all of them can vary depending upon the size of the unit desired, the nature and weight of the material being handled, the volume or capacity required from the machine, etc. However, for different embodiments especially as to the matter of size of the unit, only a little experimentation will be required to determine the best relationship or proportion of all of these factors although for the handling of packages of gum I have found that the figures given above result in a highly efficient device in which the recovery of gum runs to over 90%, many times reaching as high as 98%.

In operation, the packages of goods 31, in this instance gum, are placed upon the chute 21 and delivered through the opening 20 into the interior of the device in the region of relatively low velocity within the vortex of the circulating air or gas. Naturally they fall down into the stream of moving air and are carried by the air in an annular or circular path which follows the direction of the arrows in Figure 5. Being relatively heavy, the packages will tend to move outwardly against the inside of the perimeter of the path and they may travel around at high speed several times before the wrappings are removed but this is not always so. Generally what happens is that the package seems to "explode," as it were. This takes place very quickly and when it does the paper and the gum immediately pass out through the discharge opening 12 and the neck 13 as indicated diagrammatically by the pieces of paper 31a and the piece of gum 31b. The gum 31b is shown as curved in Figure 5 but this is not always characteristic, the shape and size of the piece of gum depending upon its brittleness which in turn depends upon the temperature and the humidity of the air. Naturally the action is violent and the tendency is to break the gum into small parts if it is brittle although it frequently comes out as one piece if it is relatively soft.

The action of my device is difficult to analyze but from much observation in practice and as a result of extensive experimentation I have repeatedly observed that as long as the package is intact it will travel around and around in the device without being thrown out through the discharge opening 12. However, immediately upon the "explosion" which I have described both the wrapping and the goods are promptly ejected, passing the downcoming jet of air at either side thereof and flowing out through the neck as indicated by the flow lines and the arrows.

As stated, the action is extremely violent there being a great deal of turbulence within the machine although the motion of the revolving packages is relatively smooth. If a package happens to light crosswise of the pathway, i. e. with its length across the width of the path the tapering portion 28, 29 and 30 acts to turn it on its axis so that it will not continue to revolve in the device but will suddenly "explode" on one of its passages around the path and then be discharged.

It is, of course, not necessary to use the box 15 and the bag 18 although this is a convenient means for collecting the discharged material. It can be allowed to blow out into the room in which the device is situated and be collected in any desired manner. After collection the gum is separated from the paper by placing the mixed mass upon a screen and blowing air upwardly through the screen to carry off the paper while permitting the gum either to drop through the screen or to pass off to one side. These details form no part of the invention per se and can be arranged as seems best in any particular instance.

I also wish to point out that the device can be used without a side inlet 20 and spout 21. In this case the packages to be unwrapped are simply thrown in through the neck 13 and the opening 12 and after they "explode" they come out through the same opening.

The pipe 23 in which the jet 22 is mounted can be rotated slightly in the pillows 32 so as to provide for adjustment of the jet for the purpose of securing most efficient operation. The exact angle of the jet has to be determined for each individual installation. However, it is important that the jet impinge slightly to the inside of the circumference.

The point 26 is curved outwardly as shown so that there is no tendency for the wrappers to catch along the edge of a sharp corner such as would exist if the neck were not curved at this point. The neck 13 while not absolutely essential is preferred because I have found that the operation is smoother when the neck is employed and the percentage of recovery greater. I have also found by much experiment that the neck should be arranged in a generally axial direction as shown with a slight incline toward the direction from which the jet is delivered. This is clearly shown in Figures 3 and 5.

The modification shown in Figures 6 to 8 is substantially like that shown in Figures 1 to 5 except that the device in this instance is provided with two diametrically opposite outlet necks 13' there being a nozzle 22' for the introduction of the pressure at each of the outlets each of which delivers in the same circumferential direction. One air supply pipe 23' supplies both nozzles 22' through a Y or branch connection 23a. As in the modification of Figures 1 to 5 the device of Figures 6 to 8 is also provided with a side inlet having a delivery chute or spout 21'.

The operation of the modified device of Figures 6 to 8 is essentially the same as that of Figures 1 to 5, the only difference being that the "exploding" packages are discharged through two discharge openings rather than through one. It should also be noted that the diameter of this double outlet unit is approximately 11 inches. In other words, a larger diameter flow path requires more than a single opening and I have found by experience and experiment that there should be a discharge opening for approximately every 15 inches of circumferential distance. This figure, however, should not be taken as limiting because all of the factors previously enumerated have somewhat of a bearing upon it but it can be used as a guide if it is desired to build units larger than the one illustrated in Figures 1 to 5.

In conclusion I wish to point out that it is not always necessary to use a drumlike housing because I have found that a bowl shaped device (somewhat in the nature of an ordinary fish bowl) will also function reasonably satisfactorily. The features which seem to be essential to success are the provision of a housing which provides a generally annular path around which the wrapped packages can travel, a peripheral opening in the annular path of a size sufficient to pass the goods and finally a nozzle arranged to deliver a high velocity jet across said opening in a direction generally circumferentially of the annular path so that a whirling or vortexlike result is created in the interior with a central region of low velocity, a region of relatively high velocity at the point of initial impingement of the nozzle and finally a region of relatively low or medium velocity at a point immediately in back of the nozzle.

I claim:

1. A device for removing wrappers from packaged goods such as chewing gum, confections or the like, comprising a housing providing a relatively narrow, generally annular path around which the wrapped packages are adapted to travel, a peripheral discharge opening in said annular path, and a nozzle arranged to deliver a high velocity jet of gas across the said opening in a direction generally circumferentially of the annular path, the width of said nozzle being materially less than the width of the discharge opening to provide a jet of gas of smaller dimension than the width of the discharge opening whereby the goods may be passed out through the opening at the side of the jet.

2. The device of claim 1 in which the peripheral discharge opening is provided with a neck extending generally radially therefrom.

3. The device of claim 2 in which the housing is provided with a package inlet arranged to receive the goods generally axially of and interiorly of the flow path.

4. The device of claim 1 in which the housing is provided with a package inlet arranged to receive the goods generally axially of and interiorly of the flow path.

5. The device of claim 1 in which the flow path is circumferentially tapered and arranged to converge toward the nozzle.

6. The device of claim 1 in which the peripheral discharge opening is provided with a neck extending generally radially therefrom, said neck, however, inclining slightly toward the direction from which the jet is delivered.

7. The device of claim 1 in which the peripheral discharge opening is provided with a neck extending generally radially therefrom, the portion of said neck opposite the jet being rounded outwardly.

CLAY G. BOYER.

REFERENCES CITED

The following references are of record in the file of this patent:

UNITED STATES PATENTS

| Number | Name | Date |
|---|---|---|
| 245,584 | Toulmin | Aug. 9, 1881 |
| 661,086 | Stebbins | Nov. 6, 1900 |
| 1,149,595 | Pipe et al. | Apr. 10, 1915 |
| 1,178,436 | Wood | Apr. 4, 1916 |
| 1,221,110 | Torrence | Apr. 3, 1917 |
| 1,234,697 | Foote | July 24, 1917 |
| 1,666,130 | Frederick | Apr. 17, 1928 |
| 1,755,471 | Curtis | Apr. 22, 1930 |
| 1,788,230 | Bost | Jan. 6, 1931 |
| 1,791,100 | Lykken | Feb. 3, 1931 |
| 2,284,746 | Kidwell | June 2, 1942 |
| 2,325,080 | Stephanoff | July 27, 1943 |
| 2,361,758 | De Fligue | Oct. 31, 1944 |
| 2,362,351 | Burmeister et al. | Nov. 7, 1944 |
| 2,441,613 | Balassa | May 18, 1948 |